T. J. STURTEVANT.
APPARATUS FOR MANUFACTURING ACID PHOSPHATE OR SUPERPHOSPHATE.
APPLICATION FILED MAY 24, 1921.
1,428,922.
Patented Sept. 12, 1922.
8 SHEETS—SHEET 1.
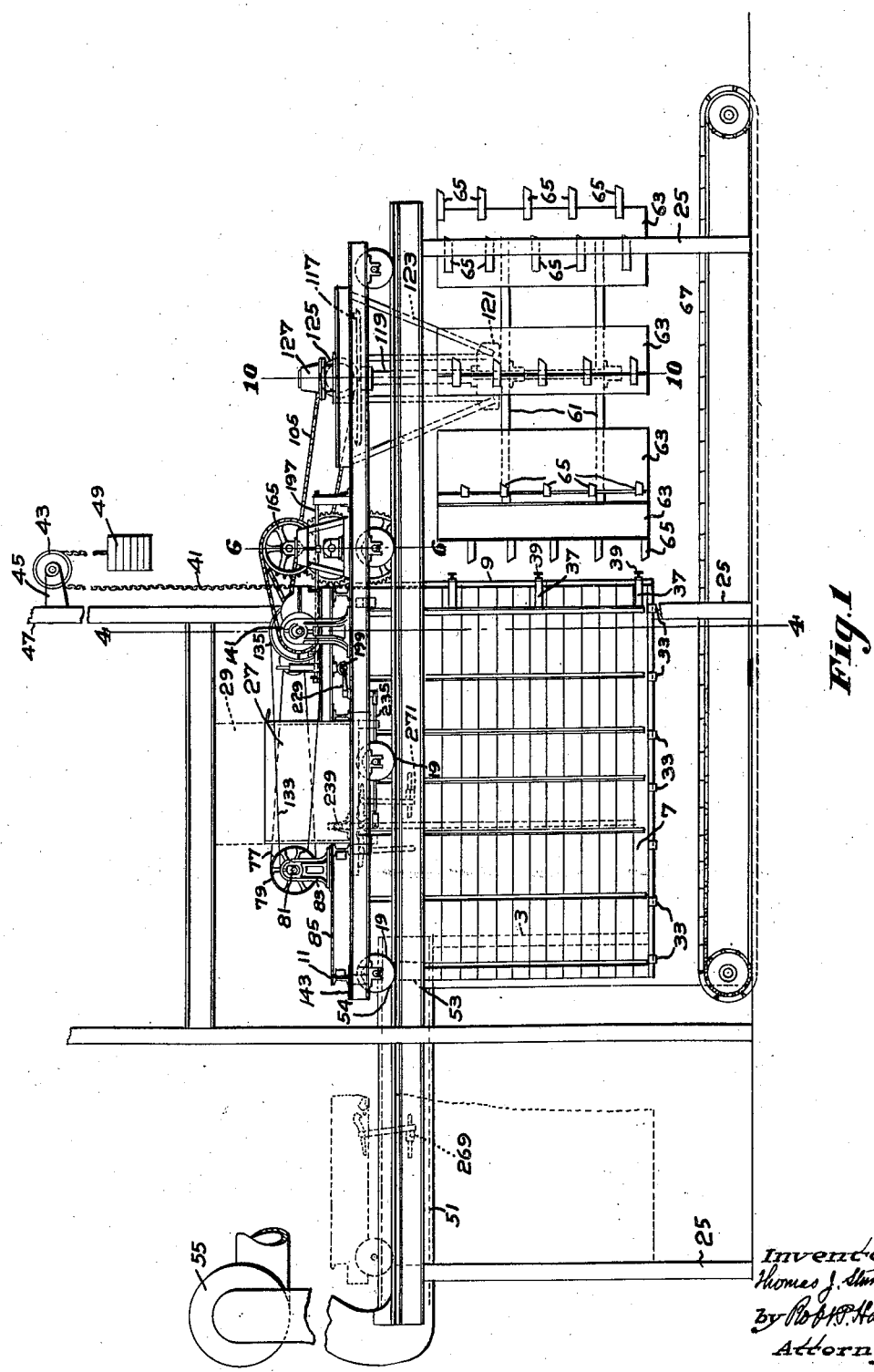

T. J. STURTEVANT.
APPARATUS FOR MANUFACTURING ACID PHOSPHATE OR SUPERPHOSPHATE.
APPLICATION FILED MAY 24, 1921.
1,428,922. Patented Sept. 12, 1922.
8 SHEETS—SHEET 2.
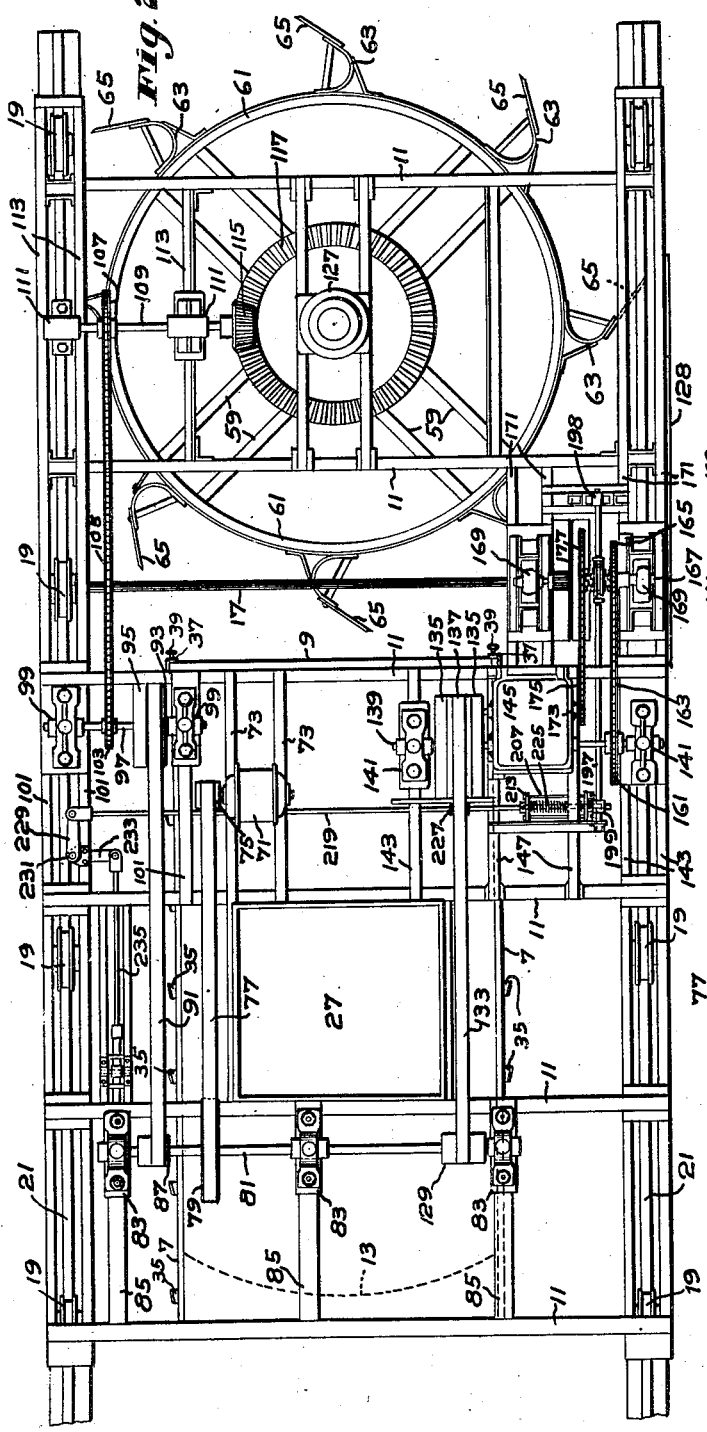
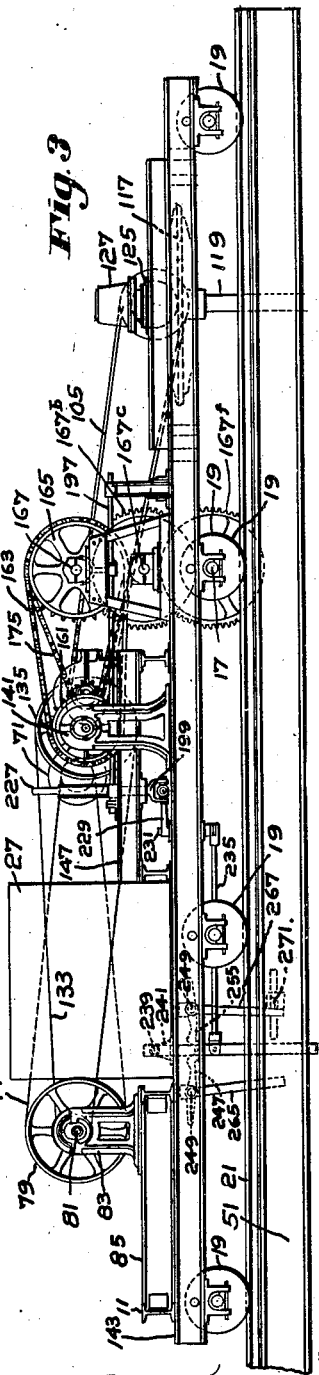
Inventor:
Thomas J. Sturtevant
by Robt. P. Harris
Attorney T. J. STURTEVANT.
APPARATUS FOR MANUFACTURING ACID PHOSPHATE OR SUPERPHOSPHATE.
APPLICATION FILED MAY 24, 1921.

1,428,922.

Patented Sept. 12, 1922.

T. J. STURTEVANT.
APPARATUS FOR MANUFACTURING ACID PHOSPHATE OR SUPERPHOSPHATE.
APPLICATION FILED MAY 24, 1921.
1,428,922.
Patented Sept. 12, 1922.
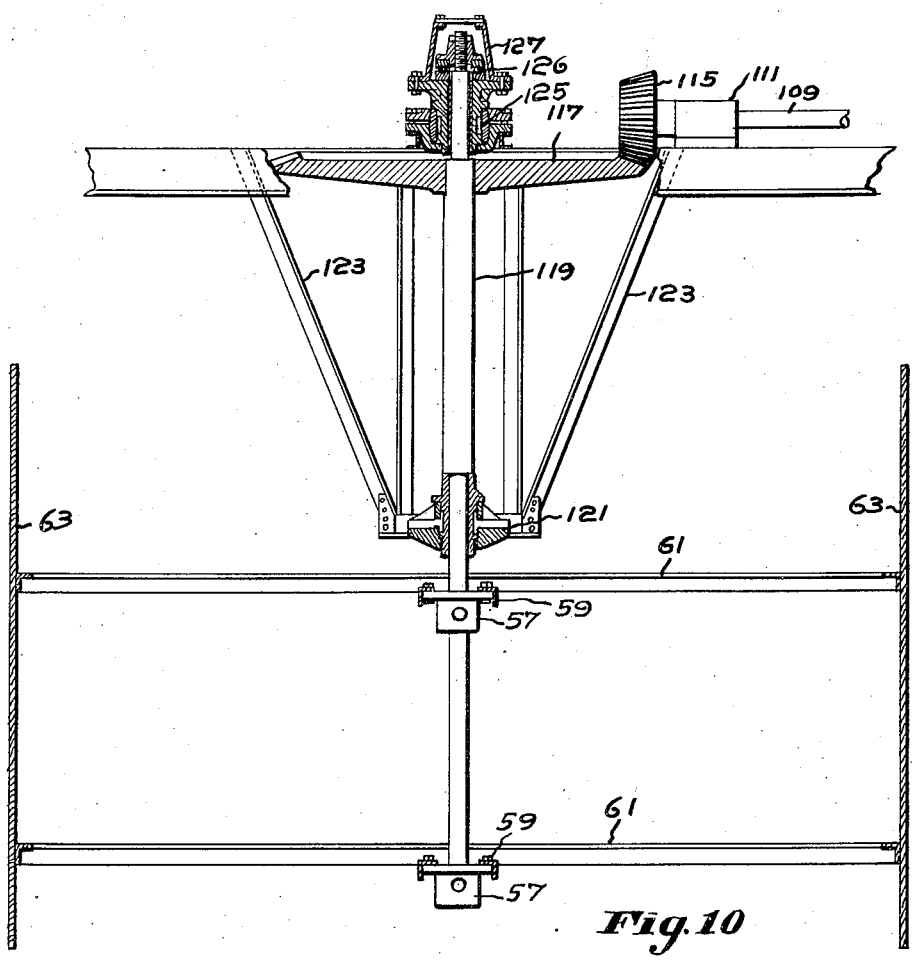
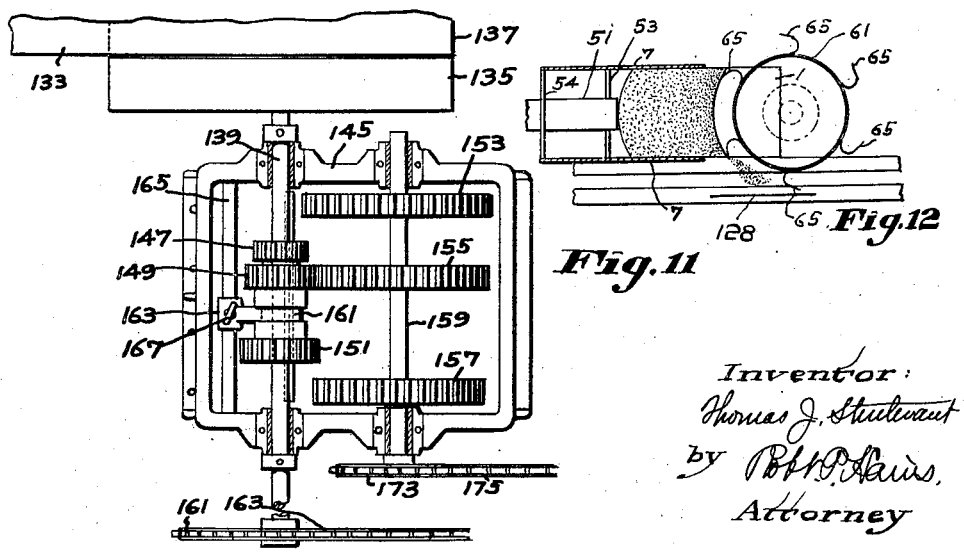

Patented Sept. 12, 1922.

1,428,922

UNITED STATES PATENT OFFICE.

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS.

APPARATUS FOR MANUFACTURING ACID PHOSPHATE OR SUPERPHOSPHATE.

Application filed May 24, 1921. Serial No. 472,174.

*To all whom it may concern:*

Be it known that I, THOMAS J. STURTEVANT, a citizen of the United States, and resident of Wellesley, in the county of Norfolk and State of Massachusetts, have invented an Improvement in Apparatus for Manufacturing Acid Phosphate or Superphosphate, of which the following description, in connection with the accompanying drawings, is a specification, like characters on the drawings representing like parts.

The invention to be hereinafter described, relates to apparatus for manufacturing acid phosphate or superphosphate.

In manufacturing acid phosphate, ground phosphate rock is mixed with an acid, such, for example, as sulphuric acid. The mixed ground phosphate rock and dilute acid are introduced into a den or chamber and allowed to stand therein a sufficient time for the chemical reaction to take place. Steam and noxious fumes accompany this reaction. The mixture when introduced into the den is in molten or semi-liquid condition, but after remaining in the den for a time, it will change from semi-liquid to solid or spongy mass form. The solid block of acid phosphate is excavated or disintegrated to aerate and further liberate steam therefrom. Then the broken down materials are carried to a storage pile to allow the chemical reaction to continue.

One of the purposes of the present invention is to provide an automatic mechanical den and excavator or disintegrator whereby a superior grade of acid phosphate with low insoluble may be manufactured under favorable mechanical conditions with reduced cost of operation.

In carrying the invention into practical effect, the mixture of ground phosphate rock and acid are introduced into a den and allowed to solidify therein. A disintegrator is provided adjacent the den, and is brought into engagement with the solid block of acid phosphate to disintegrate and excavate the same. The block and disintegrator are relatively moved in a direction of approach, so that the disintegrator may progressively excavate the block until it is substantially entirely broken down. In the present instance, the block remains stationary, the parts of the den are gradually moved away from the block, and the disintegrator is caused to travel toward the block.

It is desirable to locate the machinery for driving the disintegrator and producing the travel of the den parts and disintegrator, so that the possibility of accumulation of dust, dirt, and the acid phosphate materials thereon may be reduced to a minimum. These materials are of a sticky, adhesive character, and if the machinery is exposed thereto, the materials are liable to clog, injure and reduce the efficiency of the machinery.

In the present instance of the invention, this machinery for driving the disintegrator and producing the travel of the den parts and the disintegrator, is located up above the den, where it is out of range of the materials.

It is desirable that the working feed or travel of the disintegrator shall be slow, as it progressively cuts or breaks down the acid phosphate block, and that the return travel of the disintegrator shall be rapid so as to quickly return the den parts to their position in readiness to receive the next charge of mixed ground rock and acid phosphate.

Another purpose of the present invention is to provide driving means for the carriage which supports the den parts and disintegrator, with provision for producing a slow working travel, and a rapid return travel.

Another purpose of the invention is to provide means automatically to arrest the travel of the carriage when the disintegrator has completed its work of excavating an acid phosphate block.

With the aforesaid and other purposes in view, the character of the invention may be best understood by reference to the following description of one good form thereof shown in the accompanying drawings, wherein:

Fig. 1 is a side elevation of apparatus embodying the invention;

Fig. 2 is a plan of the apparatus shown in Fig. 1;

Figure 4:
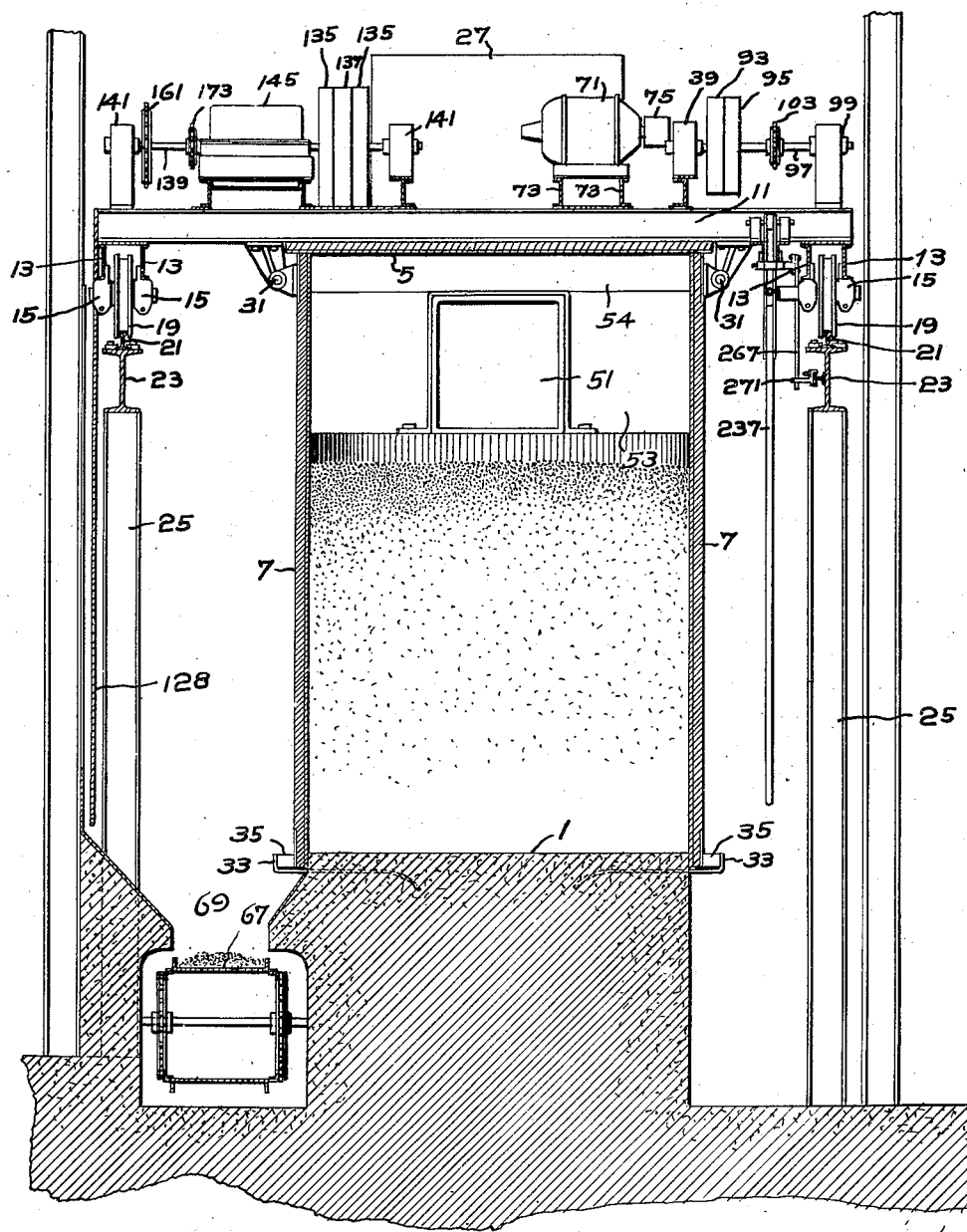
Figure 5:
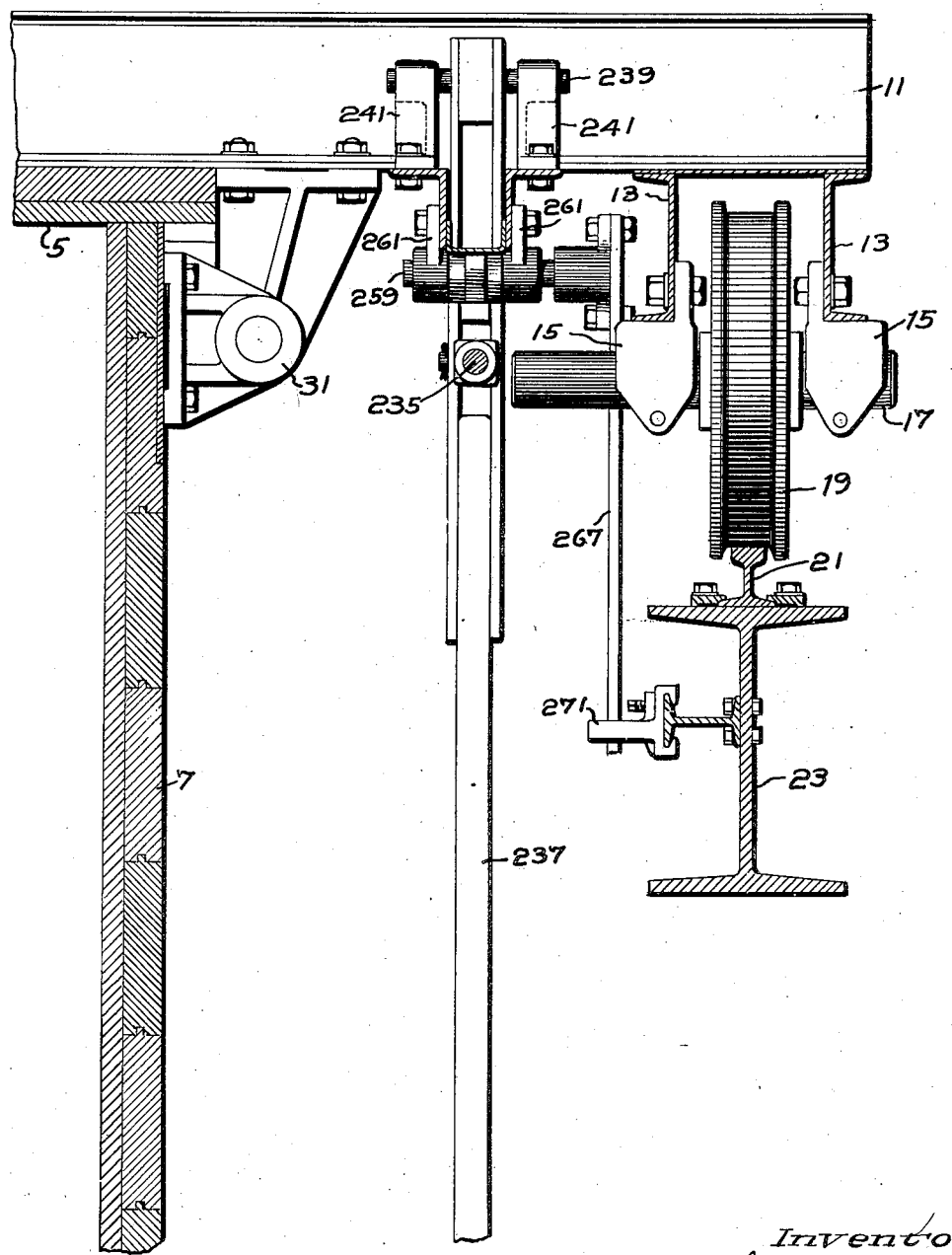
Figure 6:
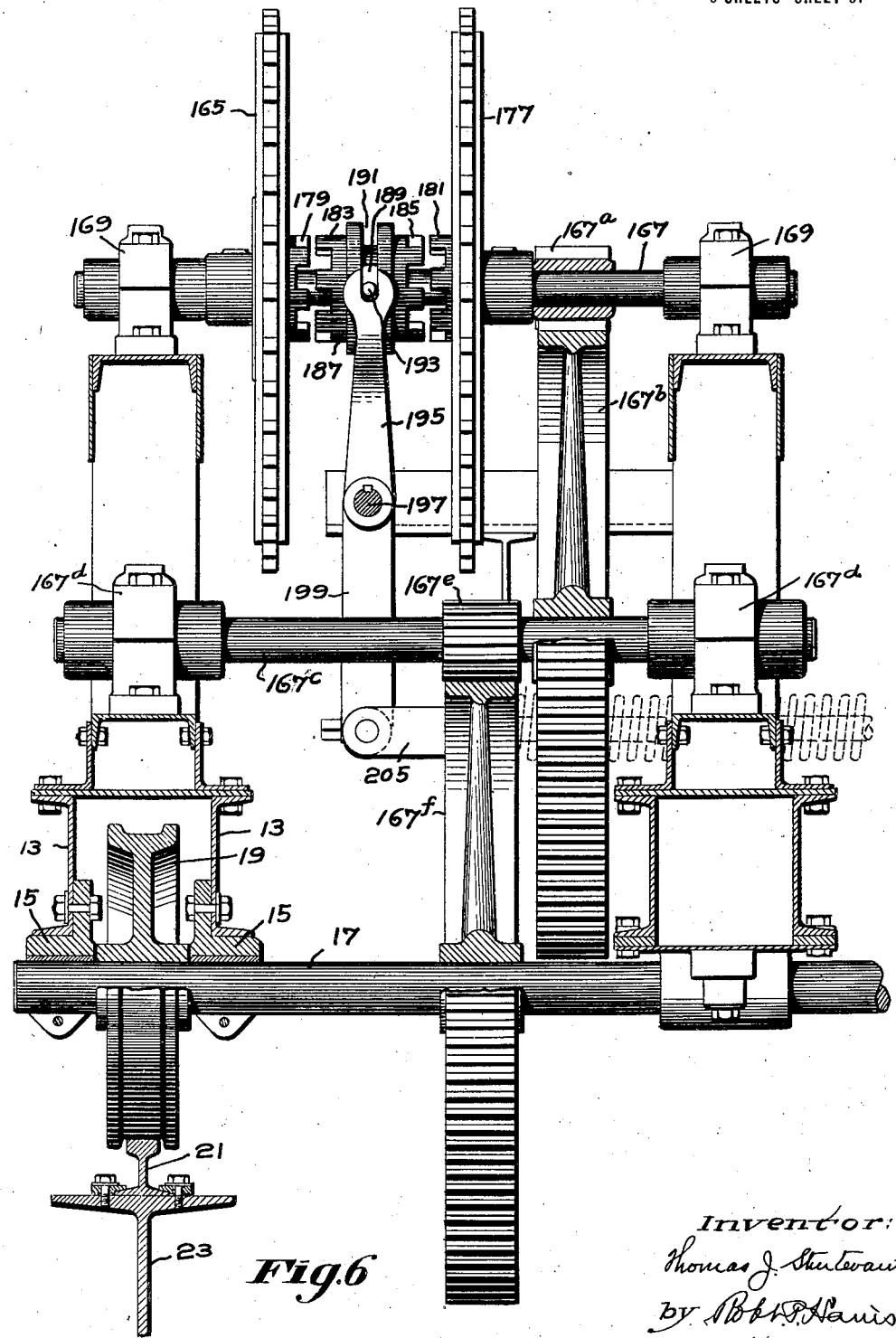
Figure 7:
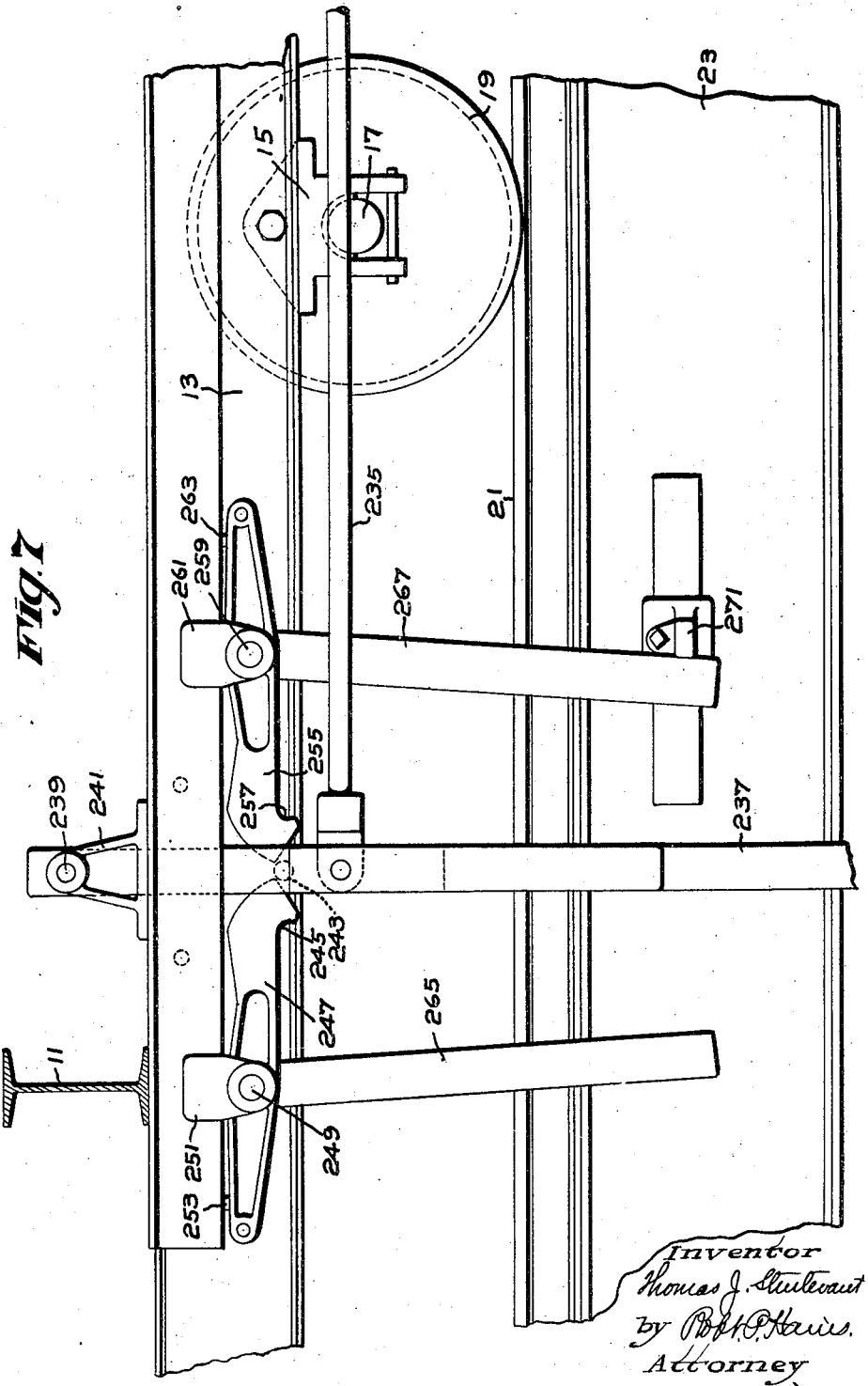
Figure 8:
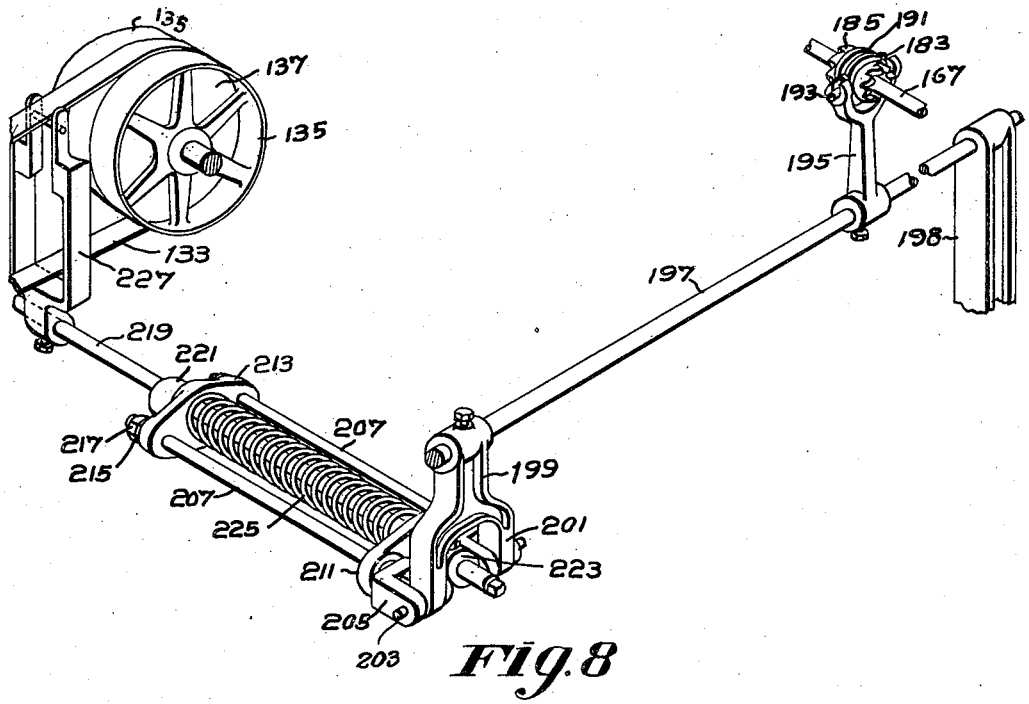
Figure 9:
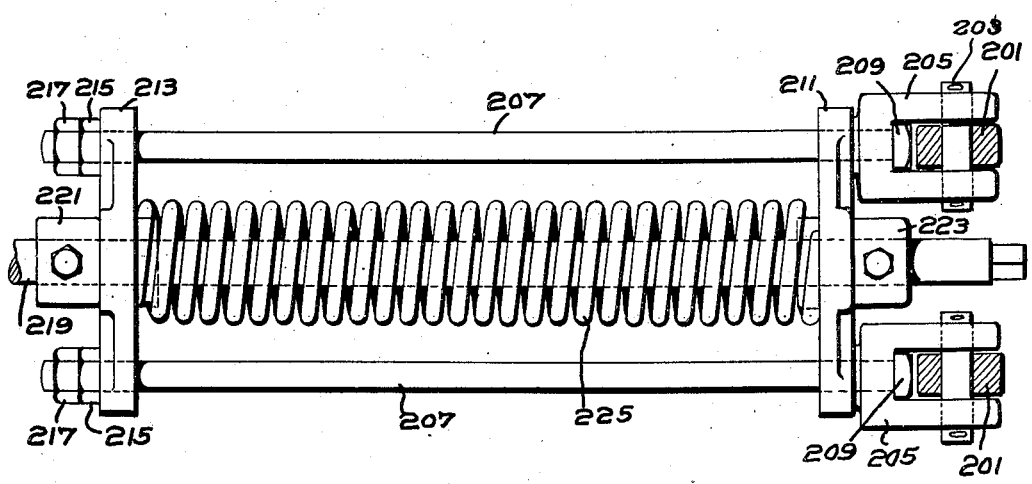

Fig. 3 on an enlarged scale is a side elevation of the carriage and driving machinery carried thereby;

Fig. 4 on an enlarged scale is a vertical section taken on line 4—4 of Fig. 1;

Fig. 5 on an enlarged scale is a vertical section showing a portion of the track, carriage and den;

Fig. 6 is a vertical section taken on line 6—6 of Fig. 1;

Fig. 7 on an enlarged scale is a side elevation of a portion of the carriage, track and mechanism for controlling the carriage;

Fig. 8 is a perspective view of a portion of a mechanism for starting and stopping the carriage;

Fig. 9 on an enlarged scale is a horizontal section through a portion of the mechanism shown in Fig. 8;

Fig. 10 on an enlarged scale is a vertical section taken on line 10—10 of Fig. 1.

Fig. 11 on an enlarged scale is a horizontal section through the transmission gear box; and Fig. 12 is a horizontal section diagrammatic view of a portion of the apparatus.

Referring to the drawings, the apparatus shown therein as embodying the invention, comprises a den or chamber having a concrete floor 1 (Fig. 4), and a concrete rear wall 3 (Fig. 1). These parts of the den may be fixed. The movable parts of the den comprise a roof or top 5, side walls 7, and a front wall 9, said roof and walls being of wood or other suitable material.

The movable den depends from and is carried by a carriage comprising transverse I-beams 11 (Figs. 1—5) mounted on and secured to pairs of channel bars 13. Secured to these channel bars are bearing boxes 15 in which are mounted journals 17 of flanged wheels 19 adapted to travel along tracks 21 mounted on I-beams 23 supported by suitable frame-work including uprights 25 rising from the floor.

The mixture of ground phosphate rock and acid may be mixed in a mixing machine of usual construction, and therefore, unnecessary to show herein. The mixer may be located above the den, and may be discharged into the den through a chute 27 communicating with an opening in the roof of the den. The chute 27 may travel with the den, and may move into and out of registration with a chute 29 leading from the mixer. When the semi-liquid mixture of ground phosphate rock and acid solidifies, it expands somewhat, and therefore, it is desirable that the side walls 7 may be susceptible of a limited outward movement, and enable ready travel of the carriage and den parts during excavation of the block by the disintegrator. To accomplish this, in the present instance, the side walls 7 are connected by strong hinges 31 (Figs. 4 and 5) with the transverse members 11 of the carriage. Series of hooks 33 may be secured in the concrete block forming the floor 1, and their upturned ends may project outward beyond the face of the block a sufficient distance to receive securing wedges 35. The construction is such that the side walls 7 may be secured by the hooks and wedges in readiness to receive the semi-liquid material. After the material has solidified, the wedges may be knocked out from the hooks, thereby allowing the side walls to rock outward somewhat to release the same from the block.

To secure the front wall 9 in closed position, series of hooks 37 may be secured to the side walls, and may have inturned ends provided with the clamp screws 39. After this wall has been lowered into position at the front of the den, the clamp screws 39 may be tightened securely to hold the front wall against the ends of the side walls.

After the semi-liquid materials have hardened, it is desirable that the front wall shall be lifted up out of the way so as to permit movement of the disintegrator or excavator toward and into engagement with the block. To facilitate lowering and raising of the front door, a cable 41 may be secured to the upper end of the door, and may pass upward over a pulley 43 carried by a bracket 45 mounted on one of the frame members 47 for the apparatus. The opposite end of the cable may be connected to a counterbalance weight 49. The construction is such that on release of the clamp screws 39, the front wall may be readily moved upward from the den, and be held by the counterbalance weight in its upper position.

Steam and noxious gases accompany the chemical reaction taking place in the den. Suitable means may be provided to exhaust them from the den. To accomplish this, in the present instance, a pipe 51 (Fig. 1) may be provided, entering through an opening in a rear wall section 53 at the top of the cement rear wall 3. A rear wall section 54 depends from the roof of the den to the upper edge of the rear wall section 53, and is movable into registration with the section 53 when the den is in charge receiving position. This pipe may communicate with a fan 55 of usual construction. The construction is such that the steam and noxious gases may be drawn from the den through the pipe 51, and during the travel of the carriage and den parts accompanying the excavating operation, the rear wall section 54 will slide along the pipe 51.

Any suitable disintegrator or excavator may be provided for excavating the block of acid phosphate. In the present instance of the invention, the disintegrator comprises a hub 57 (Figs. 1, 2 and 10) having arms 59 projecting therefrom connected to rings 61. Scoops 63 are secured to these rings, and cutters 65 are secured to and carried by the scoops. A series of cutters are provided on each scoop, and the cutters for the scoops are in staggered relation. These cutters slice off thin pieces of the acid phosphate, but since they are staggered, one spiral series or set of cutters makes a complete revolution before cutting again in the same place.

The scoops act as fans to produce strong currents of air which are blown against the exposed cuts, and have the desirable effect of aerating the excavated materials, and of blowing the materials onto a conveyor which will now be described.

This conveyor may be of any suitable construction, and in the present instance, is in the form of a pan conveyor 67 (Fig. 4) beneath a trough 69 at one side of the floor of the den. This conveyor may carry the disintegrated materials to the curing pile, or to such point as desired.

Suitable means may be provided to rotate the disintegrator. In the present instance, this means comprises an electric motor 71 (Fig. 2) which may be mounted an members 73 bridging a pair of the cross members 11 of the carriage. This motor has a pulley 75 connected by a belt 77 with a pulley 79 fast on a countershaft 81 journalled in bearings 83 mounted on members 85 bridging cross members 11 of the carriage.

Also fast on the countershaft 81 is a tight pulley 87 adapted to be connected by a belt 91 with a tight pulley 93 or a loose pulley 95 on a shaft 97 journalled in bearings 99 mounted on members 101 bridging certain of the cross members 11 of the carriage. A sprocket wheel 103 fast on the shaft 97 is connected by a sprocket chain 105 with a sprocket wheel 107 fast on a shaft 109 journalled in bearings 111 on members 113 bridging cross members 11 of the carriage. A bevel gear 115 meshes with a bevel gear 117 (Fig. 1) fast on the shaft 119 for the disintegrator.

It is desirable that the bearings for the disintegrator shaft shall be located up a sufficient distance to be out of the way of the disintegrated materials. To accomplish this, the shaft is journalled in a bearing 121 (Figs. 1 and 10) located about midway between the upper and lower ends of the disintegrator shaft, said bearing being supported by a carrier frame 123 mounted on the carriage. The upper end of said shaft is journalled in a usual self-aligning bearing 125, and is adjustably supported by an end thrust ball bearing 126 carried by the carriage, the latter bearing being provided with a protecting cap 127.

To deflect the excavated materials from the disintegrator to the trough 69 and pan conveyor 67, a shield plate 128 (Figs. 2 and 12) may be mounted adjacent to the disintegrator, and in the present instance, it is carried by and depends from the carriage.

The motor and the transmission described will serve to rotate the disintegrator, and speed reductions are obtained, owing to the difference in radii of the belt pulleys and the bevel gears, so that the disintegrator shaft may be rotated at a low speed, such, for example, as about twelve revolutions per minute. The disintegrator, however, may be of large diameter, such, for example, as about 15¼ ft., and therefore, the cutters and scoop fans may have a peripheral speed of, for example, 560 ft. per minute. As a consequence, the scoop fans produce a strong draft serving desirably to aerate the materials excavated. The disintegrator preferably is not enclosed, but operates in the open air, thereby contributing to the successful aeration effect thereof. This liberates the steam from the materials, but the aeration is such that the materials are not cooled too much, since it is desirable to retain a certain amount of heat in the materials, that the chemical reaction may be continued in the curing pile. In the block the acid phosphate is somewhat plastic and sticky, but the fan drives off sufficient moisture from the materials to prevent mulling thereof as they drop directly onto the pan conveyor. The starting and stopping of the disintegrator may be controlled by shifting the belt 91 to the tight pulley 93 and to the loose pulley 95 respectively.

Suitable means may be provided to cause the carriage carrying the den and disintegrator to travel along the tracks during the disintegrating operation, and to return quickly to bring the den parts in position to receive the next charge of materials. To accomplish this, in the present instance, the countershaft 81 referred to, may have a tight pulley 129 thereon, adapted to be connected by a belt 133 with a pair of tight pulleys 135 and a loose pulley 137 on a shaft 139 journalled in bearing 141 mounted on members 143 bridging certain of the cross members 11 of the carriage.

The shaft 139 projects through a split transmission gear box 145 (Figs. 2 and 11) mounted on members 147 bridging cross members 11 of the carriage. This shaft 139 has pinions 147, 149 and 151 splined thereon, adapted respectively to mesh with gears 153, 155 and 157 keyed to a countershaft 159 journalled in bearings in the gear box. A fork 161 has a boss 163 adapted to slide along a bar 165 mounted in the gear box, and said boss may be secured in different positions of adjustment by a hand screw 167. The construction is such that the pinions may be slid along the shaft 139 to bring the pinion 147 into mesh with the gear 153, or to bring the pinion 149 into mesh with the gear 155, or to bring the pinion 151 into mesh with the gear 157. Thus, three different speeds may be obtained for the shaft 159, but it will be understood that any number of speeds for this shaft might be obtained by different arrangements of reduction gears in the gear box.

The shaft 139 has a sprocket wheel 161 fast thereon connected by a sprocket chain 163 with a sprocket wheel 165 loose on a shaft 167 journalled in bearings 169 mounted on members 171 bridging cross members of the carriage. The countershaft 159 has a sprocket wheel 173 fast thereon connected by a sprocket chain 175 with a sprocket wheel 177 loose on the shaft 167. The work feed is obtained by the drive through the sprocket wheels 173 and 177, and the rapid return feed is obtained through the sprocket wheels 161 and 165.

The sprocket wheel shaft 167 (Fig. 6) has a pinion 167$^a$ thereon meshing with a gear 167$^b$ on a shaft 167$^c$ mounted in bearings 167$^d$ on the carriage. A pinion 167$^e$ meshes with a gear 167$^f$ on one of the journals 17 for the carriage wheels 19.

As stated, the sprocket wheels 165 and 177 are loose on the shaft 167. To connect said sprocket wheels alternatively to said shaft according to whether the work or rapid return feed is desired, the hub of the sprocket wheel 165 may be provided with clutch teeth 179 (Fig. 6), and the hub of the sprocket wheel 177 may be provided with clutch teeth 181. These teeth co-operate respectively with teeth 183 and 185 of a clutch member 187 splined to the shaft 167, and adapted to be shifted to connect the sprocket wheels alternatively to the shaft 167 by means to be described.

To shift this clutch, a yoke 189 may engage a groove 191 in the clutch member. The yoke has pins 193 engaging a fork arm 195 fast on a rock shaft 197 (Figs. 6 and 10) mounted in bearings 199 mounted on the carriage.

The rock shaft 197 also has an arm 199 (Figs. 8 and 9) fast thereon having a fork 201 at the lower end thereof. The arms of this fork are connected by pins 203 with yokes 205. Rods 207 project through holes in these yokes, and have heads 209 engaging the backs of the yokes. These rods also project through heads 211 and 213, and end portions of said rods are provided with nuts 215 and lock nuts 217.

A rod 219 projects through said cross heads, and has collars 221 and 223 secured thereon adjacent said heads. A coil spring 225 encircles the rod 219, and is confined between the heads 211 and 213.

Fast on the rod 219 is a shifter 227 (Figs. 2 and 8) for the belt 133 referred to, which may be shifted from the loose pulley 137 to either of the tight pulleys 135, to drive the transmission in the gear box and rotate the sprocket wheels 165 and 177 in opposite directions.

The rod 219 is connected to an arm 229 (Fig. 2) fast on a vertical shaft 231 mounted on the carriage. An arm 233 fast on the vertical shaft 231 is connected to one end of a rod 235 (Figs. 2, 3 and 7), and the opposite end of said rod is pivotally connected to a hand lever 237 having its upper end fulcrumed on a pin 239 in a bracket 241 mounted on the carriage.

The hand lever is adapted to be shifted to the left to initiate the work feed of the carriage, and to the right for the rapid return feed of the carriage, as more fully hereinafter described. To hold the hand lever in its work feed position, a pin 243 (Fig. 7) on the hand lever is adapted to be engaged by the hook end 245 of a latch 247 fulcrumed intermediate its ends on a pin 249 on a bracket 251 on the carriage. The rear end of the latch is adapted to engage a stop 253 to limit rocking movement thereof.

To hold the hand lever in its rapid return feed position, a latch 255 is provided having a hook end 257 adapted to interlock with the hand lever pin 243. This latch is fulcrumed intermediate its ends on a pin 259 on a bracket 261 on the carriage. The rear end of the latch is adapted to engage a stop 263.

Fast on the latch 247 and depending therefrom, is an arm 265, and fast on the latch 255 and depending therefrom, is an arm 267. The arm 265 is adapted to engage a stop 269 (Fig. 1) on one of the tracks for the carriage, and the arm 267 is adapted to engage a stop 271 on said track.

In operation, the side walls of the den are secured in closed position, and the front wall is lowered and secured to the side walls. A charge of the mixture of ground phosphate rock and acid, such, for example as thirty tons, is introduced through the chutes into the den. The charge is allowed to stand a sufficient period, such, for example, as for about fifteen minutes, for the chemical reaction to take place, and for the mixture to change from semi-liquid to solid form. Then the front wall is released from the side walls, and is raised up away from the den. The side wall securing wedges are knocked or released from their hooks to allow the side walls to swing outward somewhat and be free from the block. The large block of acid phosphate is left resting upon the concrete floor and against the concrete back wall.

The belt 91 may be shifted to the tight pulley 93, thereby transmitting power from the motor to rotate the disintegrator, and the latter may rotate continuously, if desired.

It is now desirable to initiate the work feed of the carriage to advance the disintegrator into active cutting relation with the block, and to withdraw the side walls and top of the den from the block as the disintegrator progresses toward the rear concrete wall.

To accomplish this, the operator shifts the hand lever 237 toward the left, thereby causing the pin 243 thereon to interlock with the hook 245 of the latch 247. This movement of the hand lever will draw the rod 235 to the left, rock the arms 233 and 229, thereby shifting the rod 219 toward the right (Fig. 8). Since the shifter 227 is carried by the rod 219, this movement of the latter will shift the belt 133 from the loose intermediate pulley 137 onto the tight pulley 135. This will drive the transmission in the gear box, and initiate the rotation of the sprocket wheels 165 and 177.

When the rod 219 is shifted to the right, it will cause the collar 221 on the rod to slide the head 213 along the rods 207, thereby compressing the spring 225. Preferably the nuts 215 are adjusted so as to maintain the coil spring under some compression, so that greater energy is stored in the spring 225 on shifting the rod 219, than if the spring were compressed from relaxed condition.

When the rod 219 is shifted to the right, it not only throws the belt 133 to start rotation of the sprocket wheels 165 and 177, but also it throws the clutch piece 187 into interlocking engagement with the clutch teeth of the sprocket wheel 177. The movement of the rod 219 compressing the spring 225, causes the latter to press against the head 211 which engages the forks 205, and the latter in turn rock the fork arm 199, which rocks the shaft 197 and fork arm 195 to shift the clutch.

In most instances the teeth of the clutch piece 187 will be in alignment with the teeth of the sprocket wheel, so as to interlock therewith, but if the teeth should not be in alignment, the initial shifting of the belt 135 will rotate the sprocket wheel so that the teeth will come in alignment. Thereupon, the energized spring 225 will serve to snap the clutch piece into interlocking engagement with the clutch teeth of the sprocket wheel.

When the spring 225 is energized on shifting of the rod 219 toward the right, the spring will react from the head 211, press the head 213 against the collar 221, and tend to shift the rod 219 toward the left. This rod will operate through the arms 229 and 233 and the rod 235 to pull on the hand lever and hold the pin 243 securely in the fork 245 of the latch.

The carriage will continue to travel toward the left in its work feed until the arm 265 reaches a stop 269 (Fig. 1). Thereupon, slight further travel of the carriage will rock said arm and trip the latch 247 from the hand lever pin 243.

The energized spring will then become effective to shift the rod 219 to the left, thereby throwing the belt 133 from one of the tight pulleys 135 to the loose pulley 137, and as a consequence, the work feed of the carriage will be arrested. The spring will also return the hand lever to its mid position between the latches.

Therefore, the coil spring 225 serves to automatically throw the belt to arrest the feed of the carriage, serves yieldingly to transmit movement from the rod 219 to the clutch piece 187, serves to hold the handle pin interlocked with the latch, and serves to return the hand lever to its mid position between the latches.

When it is desired to start the rapid return feed of the carriage to move the side walls back to their original position over the concrete floor in readiness to receive the next batch, the operator shifts the hand lever 237 toward the right, thereby causing the pin 243 to interlock with the hook 257 of the latch 255. This movement of the handle will shift the rod 235 toward the right, rock the arms 233 and 229, and shift the rod 219 toward the left (Fig. 8). This will move the belt shifter 227 toward the left, and throw the belt from the loose intermediate pulley 137 to the other tight pulley 135, thereby driving the transmission and the sprocket wheels 165 and 177.

The shifting movement of the rod 219 to the left causes the collar 223 to bear against the head 211, and causes the head to slide along the rods 207 and compress the coil spring 225. The coil spring in turn presses against the head 213, causing the same to engage the nuts 215 and draw the rods 207 toward the left. The rods 207 will pull the yokes 205 to the left, thereby rocking the fork arm 199, the rod 197 and fork arm 195 to shift the clutch piece 187 into engagement with the clutch teeth of the sprocket wheel 165. Since the sprocket wheel 165 is rotated more rapidly than the sprocket wheel 177, the carriage will receive a rapid return feed to bring the den parts back into charge receiving position.

If the teeth of the clutch piece 187 do not align with the clutch teeth of the sprocket wheel 165, the commencement of the rotation of said wheel obtained on shifting the belt 133, will bring the clutch teeth into alignment, so that the energized spring will become effective to snap the clutch piece into interlocking relation with the clutch teeth of the sprocket wheel.

As the carriage progresses in its return feed, the arm 267 will be brought into engagement with the stop 271, and slight further travel of the carriage will rock said arm, thereby releasing the latch 255 from the hand lever pin 243. This will render the energized spring 225 effective to shift the belt 133 back to the intermediate loose pulley 137, thereby arresting the feed of the carriage. The stops 269 and 271 may be located at points to interrupt the drive, so that the momentum of the carriage will bring the same to rest at the proper limits. Preferably the work feed of the carriage is arrested shortly before the disintegrator has cut entirely through the acid phosphate block. This prevents any possibility of the cutters coming in contact with the concrete rear wall of the den which would result in injury to the cutters.

The bearings for the disintegrator are located well up from the concrete floor of the den, thereby eliminating the necessity of bearings or supports for the disintegrator at the sides of the floor of the den. This enables simplification of the support and driving mechanism for the disintegrator and enables the same to be out of the way from the materials, and prevents them from interfering with accessibilty to the lockng device for the lower edges of the swinging side walls of the den. There are no parts to interfere with ready accessibility to these locking devices, and as a consequence, the operator may easily and quickly lock and release the doors.

The pipe 51 referred to, for conducting steam and fumes from the den, is fixed, enters the den adjacent the roof thereof, and extends straight backward beyond ends of the tracks. As a consequence, this pipe is well up out of the way, and does not interfere with the progressive travel of the den toward and from its charge receiving position.

The machinery for driving the disintegrator, producing the travel of the carriage, and the automatic arrest of the carriage, is located above the level of the acid phosphate block in the den. As a consequence, it is up out of range of the materials, both when in semi-liquid and disintegrated condition, so that opportunity for accumulation of dust, dirt and materials thereon is reduced to a minimum.

The apparatus described requires little attention on the part of the operator, and efficiently operates to excavate and aerate the phosphate. The materials broken down are automatically delivered by the fan to the pan conveyor, and are carried to storage with as little handling as possible.

It will be understood that the invention is not limited to the specific embodiment shown, and that various deviations may be made therefrom without departing from the spirit and scope of the appended claims.

What is claimed is:—

1. An apparatus for manufacturing acid phosphate, comprising, in combination, a den having movable parts, a disintegrator for excavating a block of acid phosphate formed in the den, a carriage above and carrying the disintegrator and movable parts of the den, an overhead track for the carriage, and means to drive the carriage along the track to feed the disintegrator progressively through the block and withdraw the movable parts of the den from the block.

2. An apparatus for manufacturing acid phosphate, comprising, in combination, a den having movable parts, a disintegrator for excavating a block of acid phosphate formed in the den, an overhead track, a carriage on said track carrying the disintegrator and movable parts of the den, and means to impart a slow work feed and a rapid return feed to the carriage.

3. An apparatus for manufacturing acid phosphate, comprising, in combination, a den having movable parts, a disintegrator for excavating a block of acid phosphate formed in the den, an overhead track, a carriage on said track carrying the disintegrator and movable parts of the den, means to cause the carriage to travel along the track to move the disintegrator through the block, and means automatically to arrest the carriage on completion of excavaton of the block by the disintegrator.

4. An apparatus for manufacturing acid phosphate, comprising, in combination, a den having a fixed concrete floor and rear wall, movable roof and side walls, an overhead track, and a carriage on said track carrying the movable roof and side walls of the den for moving the roof and side walls to and from the fixed floor and rear wall.

5. An apparatus for manufacturing acid phosphate, comprising, in combination, a den having a fixed floor and rear wall, a movable roof and side walls, and means to move the roof and side walls away from the floor and rear wall to expose a block of acid phosphate formed within them, a disintegrator, and means to feed the disintegrator toward the rear wall of the den to excavate the block.

6. An apparatus for manufacturing acid phosphate, comprising, in combination, a den comprising a fixed floor and rear wall, a roof, side walls, and a removable front wall, a carriage supporting the roof and side walls of the den, and driving means for the carriage to move the roof and side walls away from the floor to expose a block of acid phosphate formed in the den.

7. An apparatus for manufacturing acid phosphate, comprising, in combination, a den having a fixed floor and rear wall, a roof, side walls and a movable front wall, a disintegrator, a carriage for the roof, side walls and disintegrator, and means progressively to feed the disintegrator through the block and progressively move the side walls past the rear wall to expose the block.

8. An apparatus for manufacturing acid phosphate, comprising, in combination, means for forming a block of acid phosphate, a disintegrator, an overhead track, a carriage on said track supporting the disintegrator and parts of the forming means, and means to move said carriage progressively to advance the disintegrator through the block of acid phosphate, and progressively withdraw said parts of the forming means to expose the block.

9. An apparatus for manufacturing acid phosphate, comprising, in combination, a den having fixed portions and movable portions, a disintegrator, a carriage for the disintegrator and the movable portions of the den, and driving means for the carriage to feed the disintegrator through the block of acid phosphate formed in the den, and progressively withdraw the movable portions of the den to expose the block.

10. An apparatus for manufacturing acid phosphate, comprising, in combination, a den having fixed and movable portions, a disintegrator, and a movable overhead support for the disintegrator and movable portions of the den to advance the disintegrator through an acid phosphate block formed in the den, and to withdraw the movable portions of the den to expose the block.

11. An apparatus for manufacturing acid phosphate, comprising, in combination, a den having movable portions, a disintegrator, an overhead support for the disintegrator and movable portions of the den, means to move the overhead support progressively to advance the disintegrator through an acid phosphate block formed in the den and to withdraw the movable portions of the den to expose the block, and means automatically to arrest the overhead support after the disintegrator has completed excavation of the block.

12. An apparatus for manufacturing acid phosphate, comprising, in combination, a den having fixed portions and movable portions, a disintegrator, an overhead support for the disintegrator and movable portions of the den, means to move the overhead support to advance the disintegrator through an acid phosphate block formed in the den, and to withdraw the movable portions of the den from the fixed portions to expose the block, means automatically to arrest the overhead support when the disintegrator has completed excavation of the block, and manually operable means for starting returning movement of the overhead support.

13. An apparatus for manufacturing acid phosphate, comprising, in combination, a den having fixed portions and movable portions, an excavator, an overhead support for the excavator and movable portions, means to impart a work feed and a return feed to said support, and means automatically to arrest the support at the ends of the work feed and the return feed.

14. An apparatus for manufacturing acid phosphate, comprising, in combination, a den having a fixed floor and rear wall, a movable roof and side walls, hinge means for the upper ends of the side walls, means detachably to secure the lower ends of the side walls to the floor, and an overhead support for the roof and side walls for withdrawing the same from the floor and rear wall to expose an acid phosphate block formed in the den.

15. An apparatus for manufacturing acid phosphate, comprising, in combination, a den having a fixed floor and rear wall, a roof, hinged side walls, and a removable front wall, means detachably to secure the lower ends of the side walls to the floor, means detachably to secure the front wall to the side walls, and overhead supporting means for withdrawing the roof and side walls from the floor and rear wall to expose an acid phosphate block formed in the den.

16. An apparatus for manufacturing acid phosphate, comprising, in combination, a den having a fixed floor and rear wall, a movable roof and side walls, a pipe entered through the rear wall for withdrawing steam and fumes from the den, and overhead supporting means for moving the roof and side walls away from the floor past the rear wall to expose an acid phosphate block formed in the den.

17. An apparatus for manufacturing acid phosphate, comprising, in combination, a track, a carriage on the track, a den having portions carried by the carriage, an excavator carried by the carriage, driving means for the carriage to impart work and return feeds thereto, manually operable means for initiating said feeds, and automatically to arrest the carriage on completion of said feeds.

18. An apparatus for manufacturing acid phosphate, comprising, in combination, a track, a carriage on said track, a den having portions carried by said carriage, an excavator carried by said carriage, a motor on said carriage, transmission mechanism driven by said motor for imparting work and return feeds to said carriage, means manually energized on commencement of said feeds, and means to render said energized means effective to interrupt said transmission and arrest said carriage at the ends of its feeds.

19. An apparatus for manufacturing acid phosphate, comprising, in combination, a track, a carriage on said track, a den having portions carried by said carriage, an excavator carried by said carriage, a motor for imparting work and return feeds to said carriage, a spring energized on commencement of said feeds, and means to render the energized spring effective to arrest the carriage at the ends of said feeds.

20. An apparatus for manufacturing acid phosphate, comprising in combination, a den having movable portions, an excavator, a support for the excavator and the movable portions of the den, means to impart work and return feeds to said support, means energized on commencement of said feeds, and means operated by said energized means automatically to arrest said support at the ends of said feeds.

21. An apparatus for manufacturing acid phosphate, comprising, in combination, a track, a carriage thereon, a den having portions carried by said carriage, an excavator carried by said carriage, driving means for imparting work and return feeds to said carriage, stops for determining the limits of said feeds, means manually energized on commencement of said feeds, and means cooperating with said stops to render said energized means means effective to interrupt the drive of said carriage at the ends of said feeds.

22. An apparatus for manufacturing acid phosphate, comprising, in combination, a track, a carriage thereon, a den having portions carried by said carriage, an excavator carried by said carriage, a motor mounted on said carriage, means including tight and loose pulleys and a belt for transmitting the drive from the motor to the cariage, a belt shifter, means to move the belt shifter to shift the belt from the loose to the tight pulley to start the feed of the carriage, and means energized in the course of said movement of the belt shifter, for automatically moving the belt shifter to throw the belt from the tight to the loose pulley on completion of the feed of the carriage.

23. An apparatus for manufacturing acid phosphate, comprising, in combination, a track, a carriage thereon, a den having portions carried by said carriage, a disintegrator carried by said carriage, a motor on said carriage, a transmission for driving wheels of the carriage from the motor and including means to control the direction of feed of the carriage and means to interrupt the transmision, and manually operable means for controlling the transmission interrupting means and direction of feed means.

24. An apparatus for manufacturing acid phosphate, comprising, in combination, a track, a carriage on said track, a den having portions carried by said carriage, a disintegrator carried by said carriage, a motor on said carriage, a transmission for rotating the disintegrator from said motor, and a transmission for imparting work and return feeds to said carriage from said motor.

25. An apparatus for manufacturing acid phosphate, comprising, in combination, a track, a carriage on said track, a den having portions carried by said carriage, a disintegrator carried by said carriage, a motor mounted on the carriage, a transmission extending from the motor to wheels of the carriage and including oppositely rotated wheels, and means alternatively to render said wheels effective to feed the carriage.

26. An apparatus for manufacturing acid phosphate, comprising, in combination, a track, a carriage on said track, a den having portions carried by said carriage, a disintegrator carried by said carriage, a motor on said cariage, a transmission between the motor and wheels of the cariage including oppositely rotated wheels, a clutch for rendering either of said wheels effective to feed the carriage, a manually operable control on the carriage, and means yieldingly to impart movement from said control to said clutch.

27. An apparatus for manufacturing acid phosphate, comprising, in combination, a track, a carriage on said track, a den having portions carried by said carriage, a disintegrator carried by said carriage, a motor on said carriage, a transmission for driving the carriage from the motor including tight and loose pulleys, a belt for said pulleys, a belt shifter, a rod connected to said belt shifter, a coil spring on said rod, elements carried by said rod, manually operable means to shift said rod and move the belt shifter to throw the belt from the loose to the tight pulleys and to cause said elements to energize said spring, a latch for said handle, and means automatically to trip said latch to render the spring effective to move the shifter and throw the belt from the tight to the loose pulleys.

28. An apparatus for manufacturing acid phosphate, comprising, in combination, a track, a carriage on said track, a den having portions carried by said carriage, a disintegrator carried by said carriage, means to impart work and return feeds to said carriage including means to control the direction of feed of the carriage, means to complete or interrupt the feed of the carriage, and manually operable means for operating the direction control means and the drive completing and interrupting means.

29. An apparatus for manufacturing acid phosphate, comprising, in combination, a track, a carriage on said track, a den having portions carried by said carrige, a disintegrator carried by said carriage. driving means on said carriage for imparting work and return feeds thereto including a pair of oppositely rotated wheels, a clutch for rendering either of said wheels effective to drive the carriage, a shiftable member for starting and stopping the feed, a hand lever, and means extending from the hand lever to the shiftable member and to the clutch.

30. An apparatus for manufacturing acid phosphate, comprising, in combination, a track, a carriage on said track, a den having portions carried by said carriage, a disintegrator carried by said carriage, driving means for imparting work and return feeds to the carriage, including oppositely rotated wheels, a clutch for rendering either of said wheels effective to drive the carriage, starting and stopping means, and a hand lever operatively connected to the clutch and starting and stopping means movable in one direction to initiate the work feed, and movable in the opposite direction to initiate the return feed.

31. An apparatus for manufacturing acid phosphate, comprising, in combination, a track, a carriage on said track, a den having portions carried by said carriage, a disintegrator carried by said carriage, driving means for imparting work and return feeds to the carriage, including oppositely rotated wheels, a clutch for rendering either of said wheels effective to drive the carriage, starting and stopping means, a hand lever operatively connected to the clutch and starting and stopping means, movable in one direction to initiate the work feed, and movable in the opposite direction to initiate the return feed, and latch means for holding the hand lever in its feed starting positions.

32. An apparatus for manufacturing acid phosphate, comprising, in combination, a track, a carriage on said track, a den having portions carried by said carriage, a disintegrator carried by said carriage, driving means for imparting work and return feeds to the carriage, including oppositely rotated wheels, a clutch for rendering either of said wheels effective to drive the carriage, starting and stopping means, a hand lever operatively connected to the clutch and starting and stopping means movable in one direction to initiate the work feed, and movable in the opposite direction to initiate the return feed, latch means for holding the hand lever in its feed starting positions, and means co-operating with the latch means to release the same from the hand lever.

33. An apparatus for manufacturing acid phosphate, comprising, in combination, a track, a carriage on said track, a den having portions carried by said carriage, a disintegrator carried by said carriage, driving means for imparting work and return means to the carriage including a pair of oppositely rotated wheels, a clutch for rendering either of said wheels effective to drive the carriage, starting and stopping means, a hand lever, means including a rod to connect the lever with the clutch and starting and stopping means, said lever being movable in one direction to initiate the work feed and movable in the opposite direction to initiate the return feed, and means energized on movement of the handle to starting positions for shifting said rod to operate the starting and stopping means to arrest the feed.

34. An apparatus for manufacturing acid phosphate, comprising, in combination, a track, a carriage on said track, a den having portions carried by said carriage, a disintegrator carried by said carriage, drive means for imparting work and return feeds to said carriage including oppositely rotated wheels, a clutch to render either of said wheels effective to drive the carriage, starting and stopping means, a hand control, connections including a spring between the control and the clutch and starting and stopping means, said spring serving to hold the clutch in closed position and serving to operate the starting and stopping means to interrupt the drive of the carriage.

35. An apparatus for manufacturing acid phosphate, comprising, in combination, a track, a carriage on said track, a den having portions carried by said carriage, a disintegrator carried by said carriage, drive means for imparting work and return feeds to the carriage including oppositely rotated wheels, means to render either of said wheels effective to drive the carriage, and a transmission for rotating one of said wheels more rapidly than the other.

36. An apparatus for manufacturing acid phosphate, comprising, in combination, a track, a carriage on said track, a den having portions carried by said carriage, a disintegrator carried by said carriage, drive means for imparting work and return feeds to said carriage, a pair of oppositely rotated wheels, a clutch to render either of said wheels effective to drive the carriage, starting and stopping means, a hand lever, connections from the hand lever to the clutch and starting and stopping means including a spring, said hand lever being movable in one direction to initiate the work feed and movable in the opposite direction to initiate the return feed, means to hold the hand lever in its feed initiating positions, said spring serving yieldingly to throw and hold the clutch in closed position and serving to hold the hand lever in locked relation with its holding means, and means to release the holding means from the handle, thereby rendering the spring effective to operate the starting and stopping means to interrupt the drive and arrest the carriage.

In testimony whereof, I have signed my name to this specification.

THOMAS J. STURTEVANT.